UNITED STATES PATENT OFFICE.

SEIJI ASAKAWA, OF TOKYO-FU, AND KAICHI NOSAWA, OF CHIBA-KEN, JAPAN.

SHIP'S-BOTTOM PAINT.

1,387,448.  Specification of Letters Patent.  Patented Aug. 16, 1921.

No Drawing.  Application filed November 26, 1920.  Serial No. 426,622.

*To all whom it may concern:*

Be it known that we, SEIJI ASAKAWA and KAICHI NOSAWA, subjects of the Empire of Japan, residing, respectively, at No. 452 Ohaza Minamimai, Sendagayamachi, Toyotama-Gun, Tokyo-Fu, and at No. 1016, Yahatamachi, Ichihara-Gun, Chiba-Ken, Japan, have invented a certain new and useful Improvement in Ships'-Bottom Paint, of which the following is a specification.

This invention relates to a ship's bottom paint characterized by mixing the powdered shell of kwashi-pan (*Laganum Decagonalis*, a kind of cake-urchins) into ordinary painting materials.

The object of this invention is to obtain an efficient paint for ship's bottom excellent in preventing harmful marine organisms such as shell-fishes, sea-insects and sea-weeds from adhering to the surface of ship's bottom, and rendering more durable than any other paint now in general use.

To prepare the paint of this invention kwashi-pan collected from the sea is washed by water to dissolve off any associated salts and is dried naturally or mechanically. The dried kwashi-pan thus gained is crushed with its shell and flesh together in any suitable manner. The crushed powder is then mixed with ordinary painting materials such as oils, varnishes, drying agents, coloring matters and oils, etc., and after kneading the mixture the paint having any desired composition is obtained.

By way of example we propose the following proportion which give an excellent result.

| | |
|---|---|
| Powdered shell of kwashi-pan | 50% |
| Varnish | 30% |
| Oil | 10% |
| Coloring matter | 10% |

In operation the varnish is first mixed and kneaded with the coloring matter and after standing the mixture as it is for about 10 hours, the powdered shell of kwashi-pan and the oil are to be added and again kneaded well to the required grade.

The kwashi-pan is a kind of cake-urchins which is found in abundance in the waters of Japan, China, the Philippine Islands, Australia and India, etc. It is known to have detrimental effect upon the increase of useful shell-fishes and other marine life, and no available use has yet been found for it was a matter of suffering for fishermen to take away this obstructive thing.

The applicants have employed this cheap and plentiful material in the manufacture of useful paint especially fitted for ship's bottom, by a simple and easy treatment. By the action of some effective ingredients contained in kwashi-pan the surface of ship's bottom coated with this paint can be long maintained free from any harmful marine organisms such as shell-fishes, sea-insects and sea-weeds, and rendered more durable than any other ordinary paint.

We claim—

1. A paint for submarine use including kwashi-pan as an ingredient thereof.

2. A paint for submarine use including the powdered shell of kwashi-pan.

3. A liquid coating composition for submarine use including substantially equal parts of paint and powdered shell of kwashi-pan.

4. A paint for submarine use including powdered shell of kwashi-pan 50% and varnish 30%, oil 10% and coloring matter 10%.

In testimony whereof we have affixed our signatures in presence of two witnesses.

SEIJI ASAKAWA.
KAICHI NOSAWA.

Witnesses:
E. L. MURRAY,
T. G. SMITH.